Figure 1:
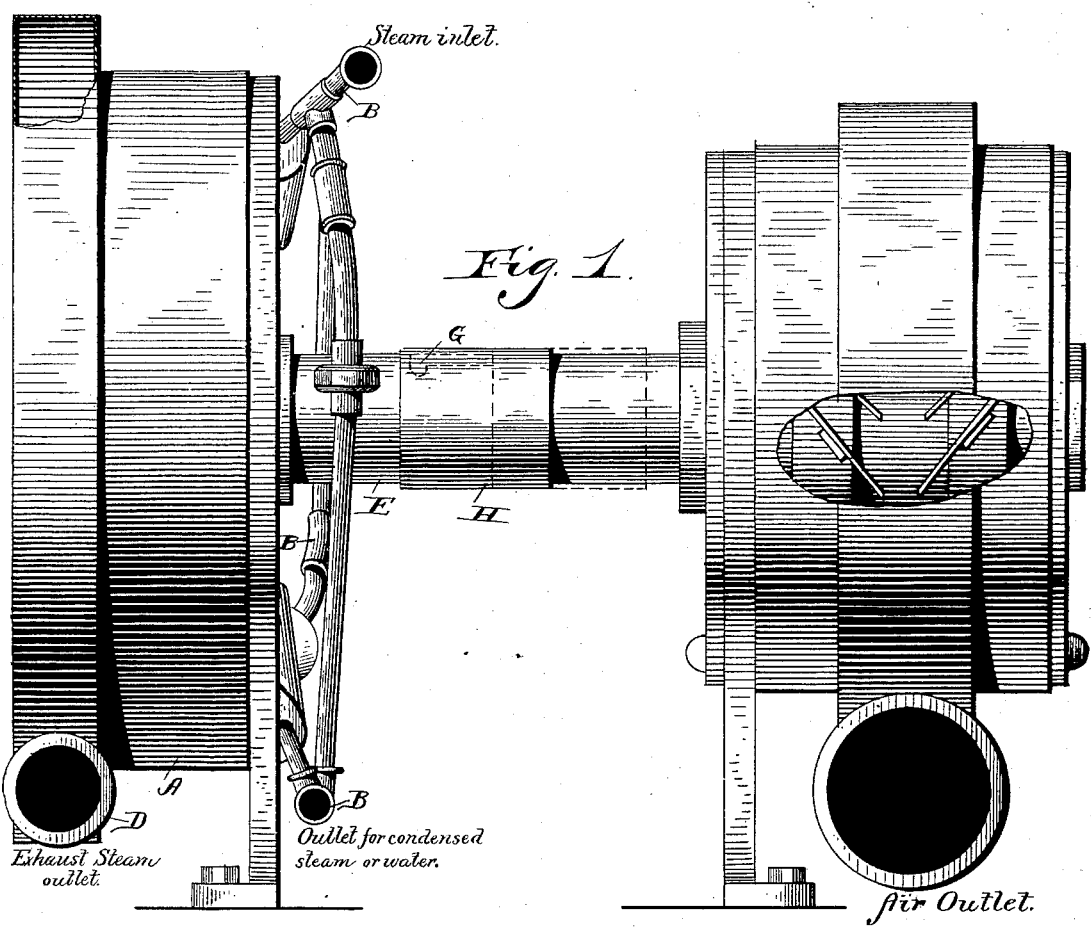

(No Model.) 5 Sheets—Sheet 1.

T. THORNTON.
COMBINED ROTARY ENGINE AND BLOWER.

No. 340,834. Patented Apr. 27, 1886.

Steam inlet.
Exhaust Steam outlet.
Outlet for condensed steam or water.
Air Outlet.

WITNESSES
John Enders Jr
F. R. Harding

INVENTOR
Thomas Thornton
Duff H Brashear
Attorneys

N. PETERS, Photo-Lithographer, Washington, D. C.

(No Model.) 5 Sheets—Sheet 2.
T. THORNTON.
COMBINED ROTARY ENGINE AND BLOWER.
No. 340,834. Patented Apr. 27, 1886.
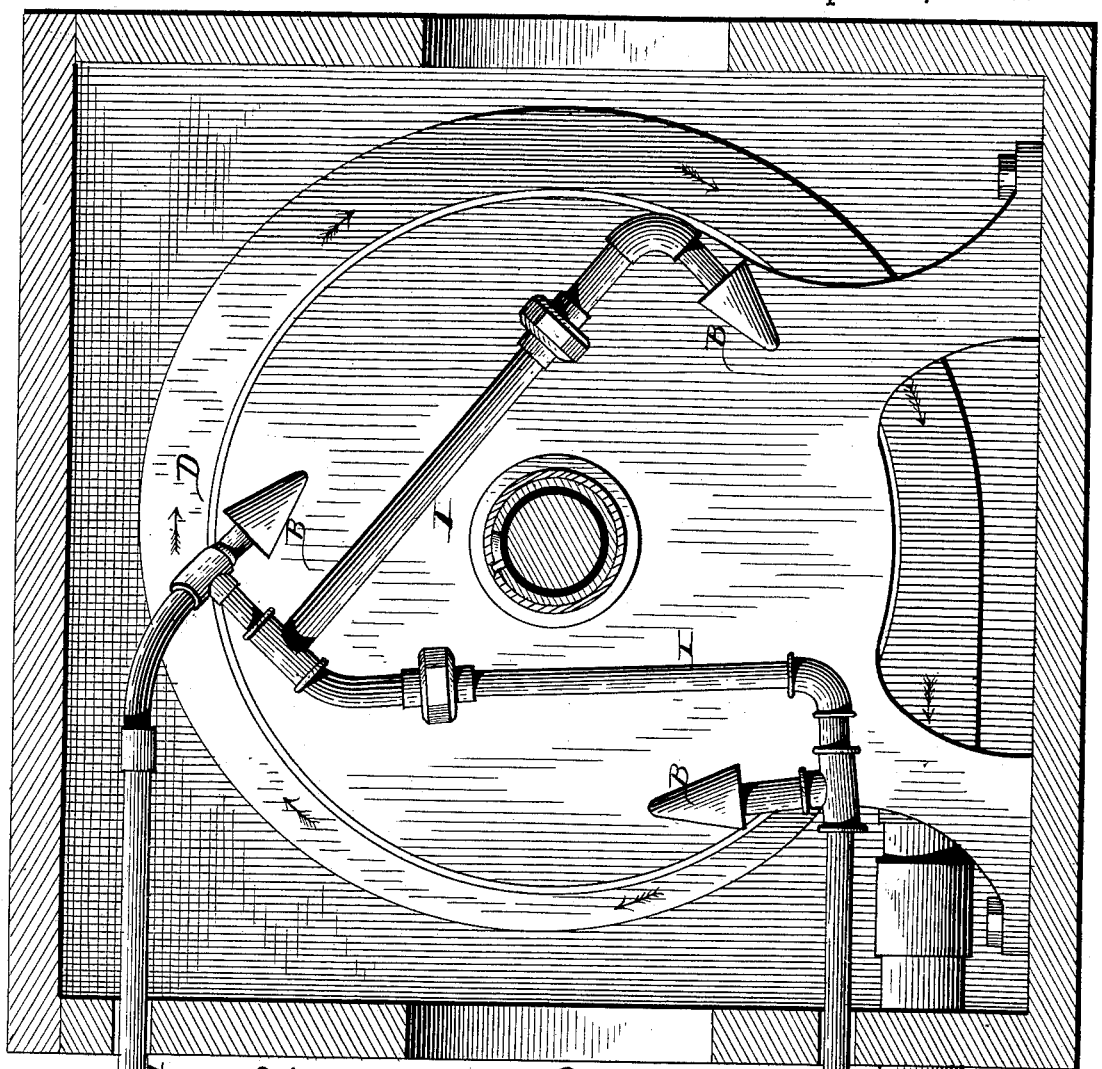
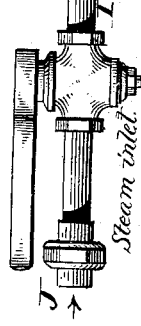
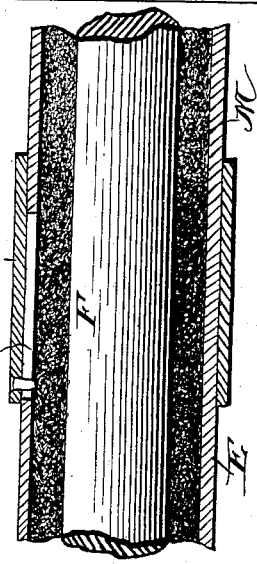
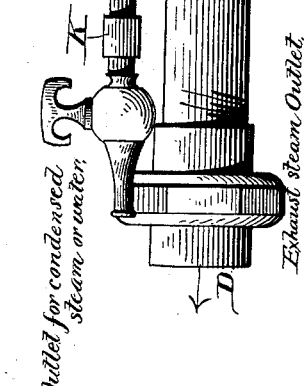
WITNESSES
John Enders Jr.
F. R. Harding
INVENTOR
Thomas Thornton
Duffy & Broshears
Attorneys (No Model.) 5 Sheets—Sheet 3.
T. THORNTON.
COMBINED ROTARY ENGINE AND BLOWER.
No. 340,834. Patented Apr. 27, 1886.

(No Model.) 5 Sheets—Sheet 4.
T. THORNTON.
COMBINED ROTARY ENGINE AND BLOWER.
No. 340,834. Patented Apr. 27, 1886.

WITNESSES
John Enders Jr
F. R. Harding

INVENTOR
Thomas Thornton
Duffy & Brothers
Attorneys

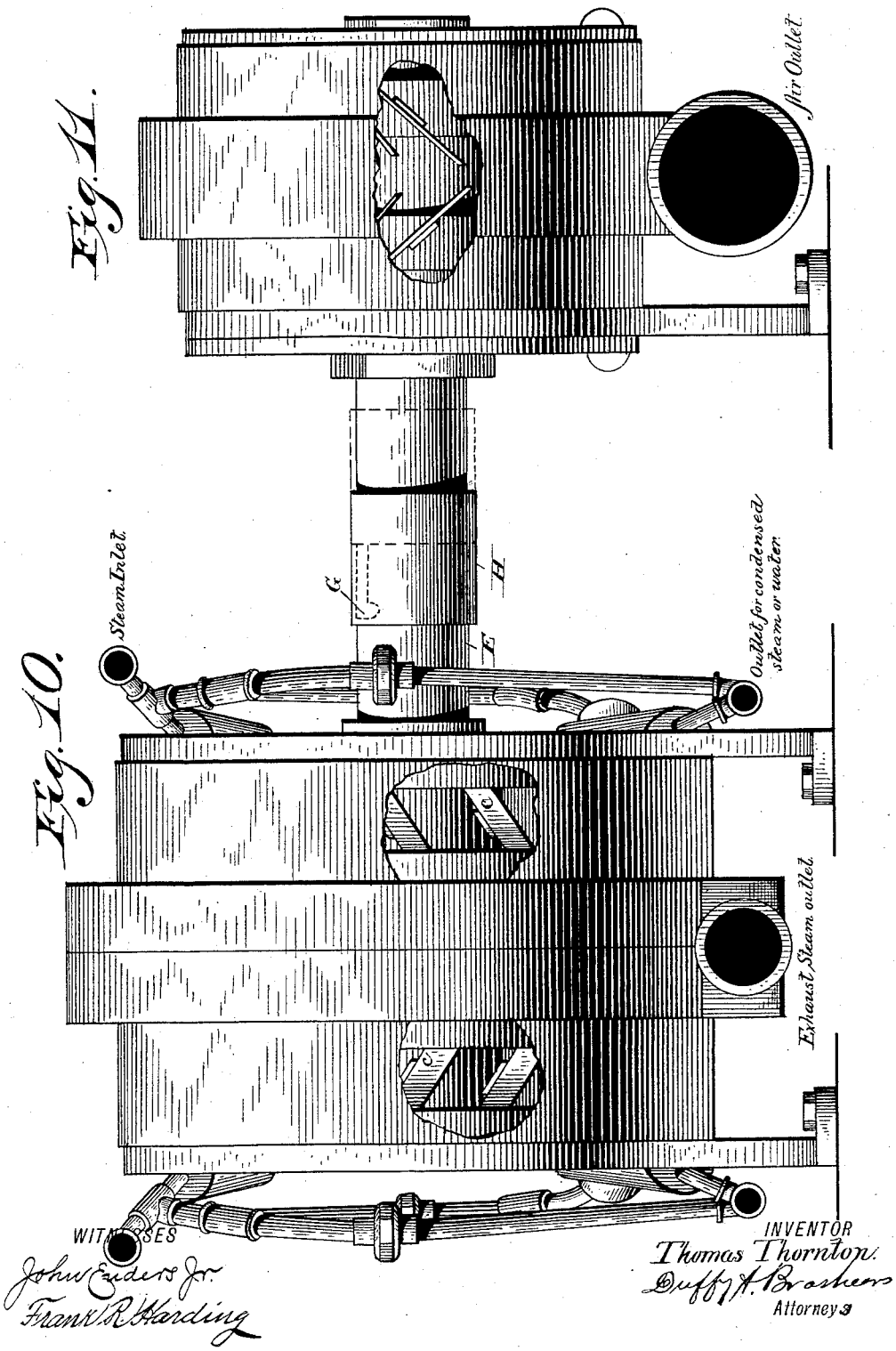

UNITED STATES PATENT OFFICE.

THOMAS THORNTON, OF TIDIOUTE, PENNSYLVANIA.

COMBINED ROTARY ENGINE AND BLOWER.

SPECIFICATION forming part of Letters Patent No. 340,834, dated April 27, 1886.

Application filed October 6, 1885. Serial No. 179,165. (No model.)

*To all whom it may concern:*

Be it known that I, THOMAS THORNTON, of Tidioute, in the county of Warren and State of Pennsylvania, have invented certain new and useful Improvements in Combined Rotary Engines and Blowers; and I do hereby declare that the following is a full, clear, and exact description of the invention, which will enable others skilled in the art to which it appertains to make and use the same, reference being had to the accompanying drawings, and to the letters of referenc marked thereon, which form part of this specification.

This invention relates to combined rotary engines and blowers, in which the engine and blower are mounted on the same shaft running in the same journals, which are suitably connected by a hollow shaft arranged concentrically around the main or driving shaft, the latter being much smaller in diameter than the former, the space between the shafts forming a pocket, in which is placed suitable lubricating material.

The object of the invention is simplicity in construction, cheapness in first cost and repairs, and ease of manipulation.

The invention consists, essentially, in the construction and combination of parts, whereby the pressure of steam on the engine is balanced; the arrangement of the inlet-ports with respect to the piston or steam-pockets, whereby the steam impinges on the faces of the pistons at an angle tangential to the periphery of the wheel, and in turn with the free exhaust-passage, whereby the engine is free from back-pressure; also, in the contour of the pistons and their angle of impact with relation to the steam-ports, by which the steam is made to give up its greatest force on the face of the piston, and its ready exhaust relieves the engine from throttling.

It also consists in other details of construction, as will be hereinafter more fully described.

The invention further consists in the combination of the engine and blower acting in harmony to produce even and balanced action, so necessary to smooth operation. These engines and blowers run at a very high rate of speed, and if they are not perfectly balanced a pounding and irregular action is produced. In this case the pressure exerted on the fan-vanes is proportionate to the pressure imparted to the engine. By this means uniformity of action, pressure, and resistance is produced. The steam is introduced to the cylinder at certain equal intervals of space around the circumference of the piston-blades—say about one-third their depth from the top—and passes down to the pocket, where slight expansion takes place, and upward to their periphery, where the exhaust is taken off in a gradually-increasing exhaust-port to its exit. This exhaust-port is tapering or gradually increasing in size from the first jet to the last, so that provision is made for the increased volume of exhaust-steam as it leaves the various pistons after it has spent its force.

The blower shown and mounted on the opposite end of the shaft from the engine will not be claimed, broadly, in this application, as its novel construction will form the subject-matter of a separate application.

Figure 2:
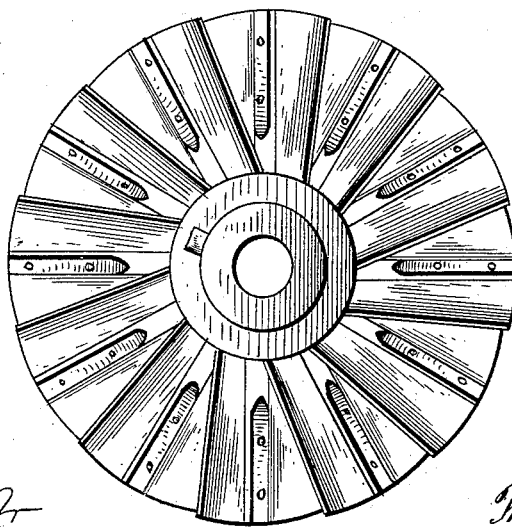
Figure 5:
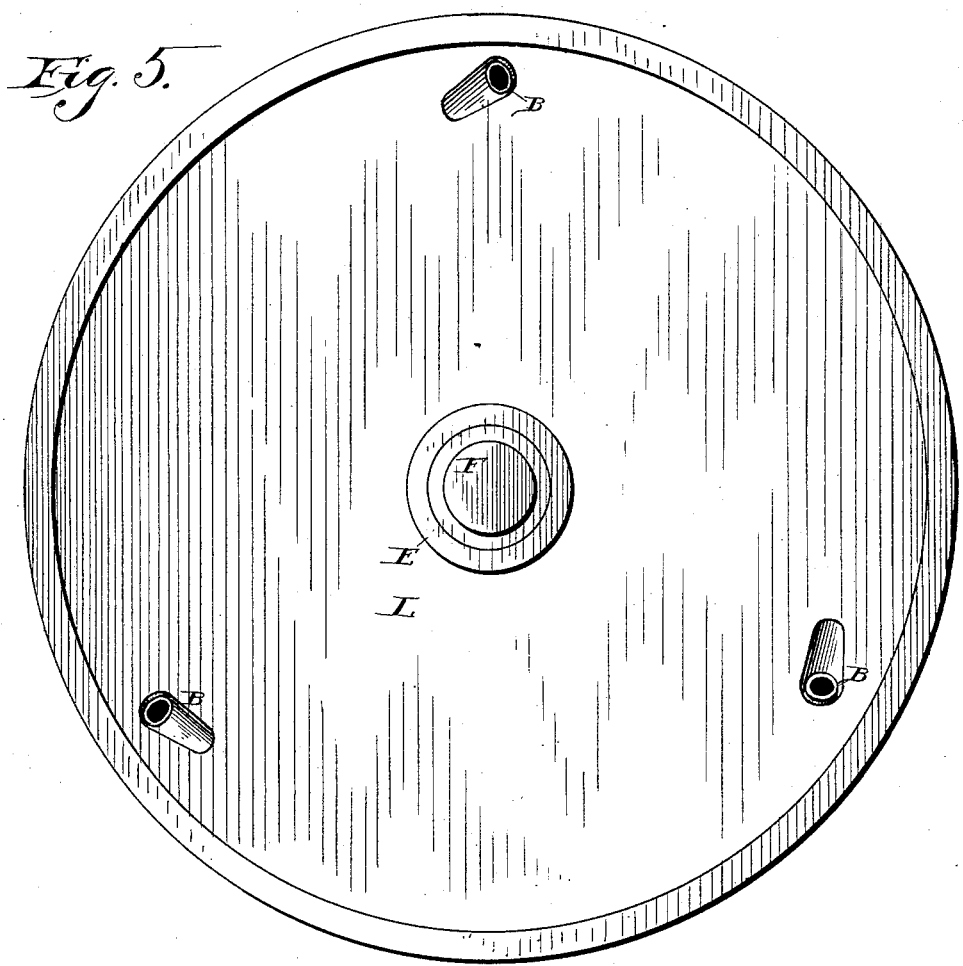
Figure 6:
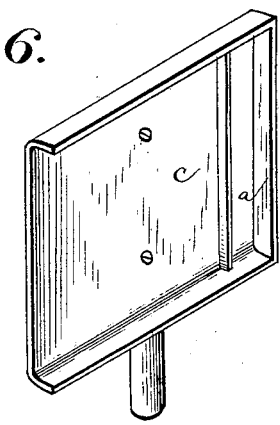
Figure 7:
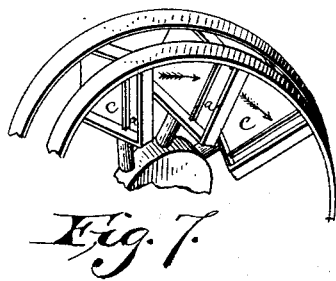
Figure 9:
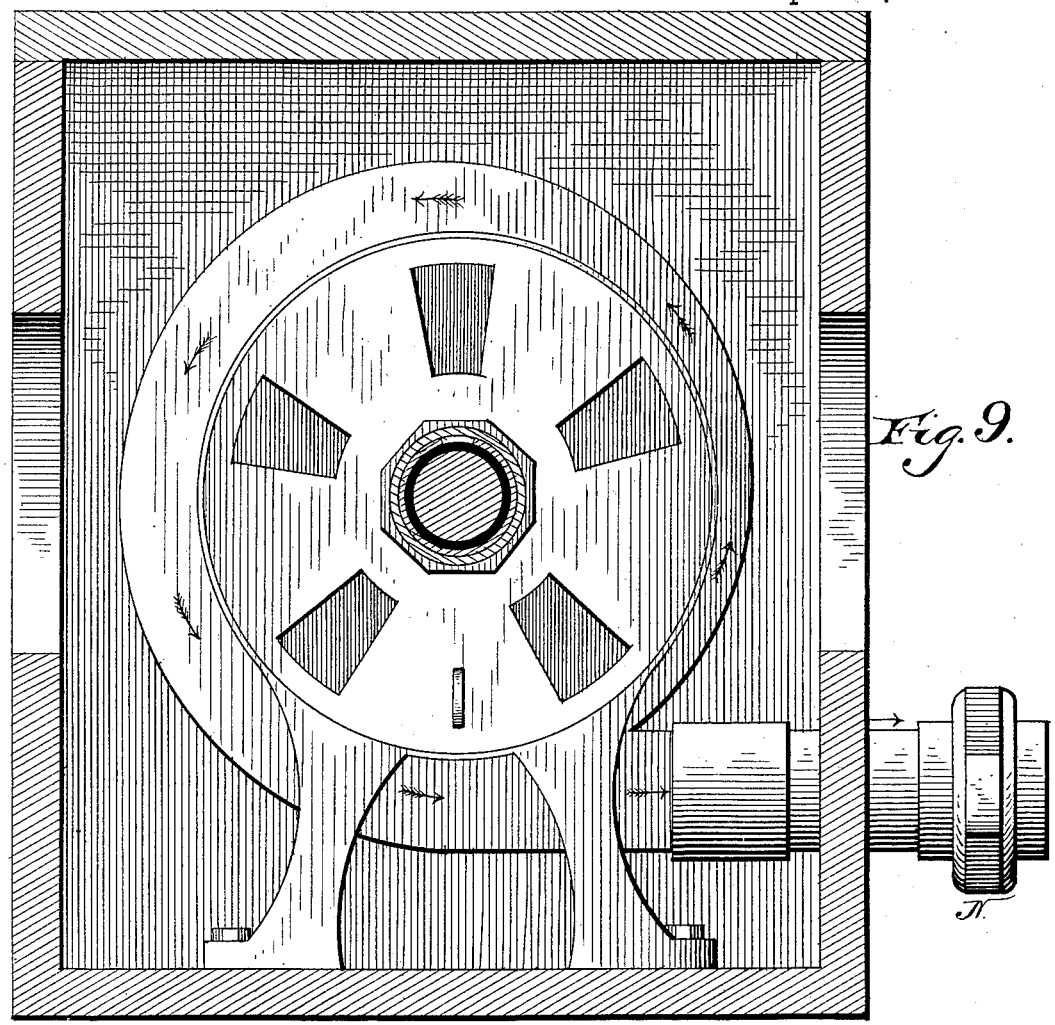
Figure 8:
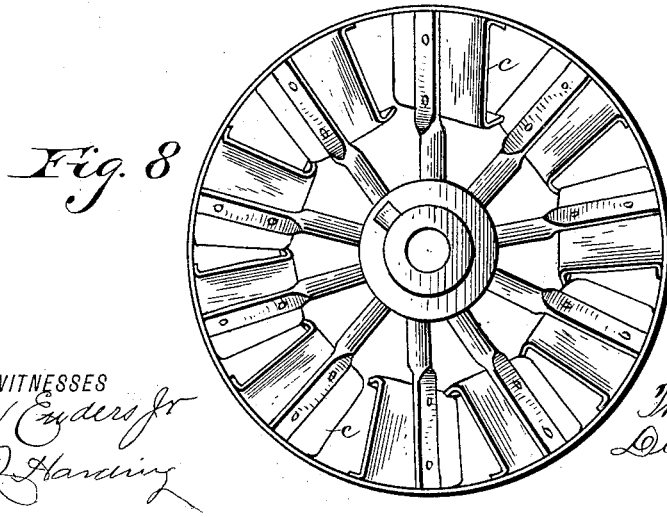

Referring to the drawings, Figure 1 shows a side elevation of my combined engine and blower mounted upon the same shaft. Fig. 2 is a detached face view of the fan-wheel. Fig. 3 is an end elevation of the engine, showing the steam-supply pipes. The engine and blower are completely fixed within a box suitably constructed for that purpose, so that the engine and blower may be moved about from place to place when required. Fig. 4 represents in section a part of the hollow shaft or sleeve, also a section of the driving-shaft, and the space between them filled with fibrous material, which is saturated with oil or other lubricating material. Fig. 5 is an inside face view of the cylinder-head, showing the position of the steam-induction ports. Fig. 6 shows a perspective of one of the pistons or vanes which are provided with a steam-pocket. Fig. 7 is a perspective view of a portion of the piston-wheel, looking from the induction cylinder-head. These pistons-vanes are set at such an angle as to receive the steam on a direct line or flatwise, whereby the full force of the steam is exerted and at an angle to the cylinder-head of about thirty degrees, so that the steam is boxed for expansion, and at an inclination from the center, so as to throw off the exhaust-steam sidewise and up into the exhaust-port, which is beyond the periphery of the cylinder, thus freeing the engine from back-pressure, all of which will be more fully described hereinafter. Fig. 8 is a face view of the piston-wheel, showing the construction of the piston-vanes and their tangential position. Fig. 9 shows an outside end view of one of the fan-heads having the air-inlet ports and the air-conveying conduit, which is tapering and increasing in diameter, to correspond with the increasing volume of air, which enlarges as it concentrates toward the eduction or exhaust end. It will be observed that this eduction-port is centrally located, and the air after it enters the fan is thrown toward the center, from where it has free escape. Fig. 10 is an elevation of a double engine. This is simply a duplicate of the single engine, and is only used when double the quantity of air is required. When the double engine is used, I locate a diaphragm through the middle, and through the exhaust-port the latter may join into a conduit common to both engines, or one of the engines may have the piston-wheel reversed, also reversing the live-steam ports. When this is done, either engine may be used, when desired. Fig. 11 is an elevation of the fan with a portion of the casing broken away to more fully show the position of the vanes. The vanes or blades of the fan are arranged to cut off the inflow of air as soon as it enters, which deflects it against a second set, which forces it to the central conduit or exhaust-tube. Said tube or conduit increases in size from the beginning to its exit or exhaust nozzle.

I will now describe my invention in detail by letters, in which A shows the steam-cylinder, and B B B the steam supply or induction pipes. These pipes are arranged at equal distances apart around the face of the cylinder near its periphery. (See Figs. 3 and 5.) These supply-pipes have nozzles arranged at such an angle that the steam from them will strike the piston-vanes C full on their flat sides or faces. These piston-vanes C are also arranged at such angles as to receive the full force of the steam as it comes from the supply-pipes. The angle at which the vanes C are arranged deflects the steam after it has spent its force to the exhaust-port. The piston-blades have upturned flanges, which compel the steam to be thrown to the periphery of the cylinder into port D, which is tapering from the first supply-pipe to the last and enlarging outward beyond the periphery of the engine. The steam is thus thrown entirely out of the engine-wheel.

Heretofore the exhaust-steam of rotary engines exhausted through or near the center; but with mine the steam, flying constantly toward the periphery, exerts all of its pressure until it leaves the piston-vane. It may be remarked, incidentally, that steam at sixty pounds' pressure will cut off one hundred and fifty thousand times per minute. This is plain to be seen. There are ten piston-blades and three steam-supply pipes. The engine runs at five thousand revolutions per minute, which would be fifty thousand to each pipe, each supply-pipe being shut off five thousand times by each of the ten vanes or blades. This statement may be considered irrelevant; but, on the other hand, it may serve to illustrate or explain the action of the engine, which may be run by gases other than steam.

The fan-wheel, which is provided with twelve vanes or blades, draws in, cuts off, deflects, and discharges into the exhaust-tube a very large volume of air, and forces it into the furnace or other place to be supplied at a very much reduced expenditure of power, as compared with the old plan. This saving is caused by the particular form and arrangement of vanes and the instantaneous cutting off of the air and deflecting it from the said cut-offs to the exhaust-conduit on the periphery of the blower, which is located to one side of each of the sets of fan-blades. There being two sets, the take-up conduit will naturally occupy a central position.

E is the sleeve or hollow shaft, mounted on the main shaft F. The sleeve is provided with a hole, G, for filling in lubricating-packing. This hole is covered by a sliding sleeve, H, which is provided with a catch, something like a bayonet-joint, which retains the cover H in position when in place. The shaft F passes entirely through the fan, engine, and sleeve, the latter being stationary. When the shaft revolves, it carries the skeleton piston and fan-blades with it, the engine-cylinder and fan-casing being stationary.

I I I are the steam-supply pipes, which convey steam to the pipes B.

J is the pipe leading to the boiler, which may be provided with the usual throttle-valve.

K is a pipe for carrying off water of condensation from the supply-pipes, or water that may pass over with the steam.

The piston vanes or blades are mounted on rods fixed in a common hub, radiating therefrom like the spokes of a wheel.

The piston's blades have pockets $a$, which temporarily box the steam and allow it a short time for expansion, but do not interfere with the ready exhaust. Should any steam remain in chamber $a$, it acts simply as a cushion, yet exerting its expansive power against the side of the casing or cylinder-head L.

The end head of both engine and fan are provided with prolongations, which form a support or legs for the machine.

M is the lubricating-packing between the sleeve and the main shaft. This packing may be of ordinary "waste" and saturated with lubricating-oil.

The journals of the machine are automatically lubricated from the hollow shaft, except the outside ones, which may be provided with the usual lubricating-cups.

The parts may be connected to the steam-boiler or other motive-power pressure by the ordinary union, (shown at N, Fig. 9.)

Having thus described my invention, what I claim as new, and desire to secure by Letters Patent, is—

1. The combination, in a rotary engine, of the skeleton frame carrying piston-blades, said blades having flanges and arranged at an angle tangential to the stationary end of the cylinder, with the live-steam inlet-ports at like angles oppositely arranged, substantially as set forth.

2. The combination, in a rotary engine, of the main shaft common to the rotary engine and blower, the sleeve on said shaft forming a pocket for lubricating material, and the sliding sleeve or cover arranged outside the stationary sleeve E, all operating together as set forth.

3. The combination, in a rotary engine, of the skeleton piston-head carrying piston vanes or blades, said blades being arranged at an angle to the inner face of the cylinder-head, with the tapering exhaust-port arranged at a circumference larger than the circumference of the piston, as set forth.

4. The combination, in a rotary engine, of the piston having its blades or piston-vanes angular and set tangential to the periphery of the cylinder and provided with flanges having the same angle, whereby the steam is made to impinge against the cylinder-head, and expanding against the piston-blade, and deflected tangentially into the exhaust-port beyond the periphery of the engine, substantially as set forth.

5. The combination, in a rotary engine, of the cylinder, the piston-head having the piston-blades set at an angle, as described, the supply-ports B, and pipes I, said ports being equally arranged around the cylinder-head, whereby the same pressure of steam is given to the piston-wheel at the several points described, for balancing the same, substantially as set forth and described.

In testimony that I claim the foregoing as my own I hereunto affix my signature in presence of two witnesses.

THOMAS THORNTON.

Witnesses:
O. E. DUFFY,
L. BRASHEARS.